United States Patent Office 3,672,865
Patented June 27, 1972

---

3,672,865
INCREASING THE SUGAR CONTENT OF CROPS WITH α-UREIDOOXYCARBOXYLIC ACIDS AND THEIR DERIVATIVES
Linus M. Ellis, Wilmington, Del., assignor to E. I. du Pont de Nemours and Company, Wilmington, Del.
No Drawing. Continuation-in-part of application Ser. No. 801,169, Feb. 20, 1969, which is a continuation-in-part of application Ser. No. 657,049, July 31, 1967, which is a continuation-in-part of application Ser. No. 572,888, Aug. 17, 1966, which in turn is a division and continuation-in-part of application Ser. No. 206,154, June 29, 1962, now Patent No. 3,282,987. This application Jan. 5, 1970, Ser. No. 846
Int. Cl. A01n 9/24
U.S. Cl. 71—106
6 Claims

ABSTRACT OF THE DISCLOSURE

The sugar content of sugar cane and sorghum can be increased by applying to those crops an effective amount of an α-ureidooxycarboxylic acid compound, such as methyl α-ureidooxypropionate or ethyl ureidooxyacetate, during the period of 10 to 60 days prior to normally scheduled harvest.

RELATED APPLICATIONS

This application is a continuation-in-part of my copending application Ser. No. 801,169, filed Feb. 20, 1969, which in turn was a continuation-in-part of my then copending application Ser. No. 657,049, filed July 31, 1967, which in turn was a continuation-in-part of my then copending application Ser. No. 572,888, filed Aug. 17, 1966, all now abandoned, which was in turn a divisional and continuation-in-part of my then copending application Ser. No. 206,154, filed June 29, 1962, which has issued as U.S. Pat. No. 3,282,987.

BACKGROUND OF THE INVENTION

This invention relates to the use of chemical compounds to increase the sugar content of sugar cane or sorghum. More specifically it is directed to the use of α-ureidooxycarboxylic acids and their derivatives of Formula I below, to increase the sugar content of sugar cane and sorghum crops by applying a compound of Formula I to the crop during the period 10 to 60 days prior to normally scheduled harvest.

Netherlands Pat. No. 6,507,586 discloses use of some compounds of Formula I as post-emergence herbicides for chemical weed control. However there is no mention in the patent of sugar-increase activity and no suggestion that the compounds be applied to sugar-containing plants 10 to 60 days prior to normally scheduled harvest.

The search for chemical agents which are useful for increasing the sugar content of sugar cane and sorghum is well documented in articles such as "Preliminary Experiments on the Effects of Chemicals on the Ripening of Sugar Cane" by R. A. Yates and J. F. Bates at pages 174–189 of the Proceedings of the 1957 Conference of the British West Indies Sugar Technologists; "A Summary of Investigations on the Possibility of Artificially Ripening Sugar Cane with Various Chemicals" by H. Evans and J. F. Bates at pages 298–307 of the 1962 Proceedings of the International Society of Sugar Cane Technologists: and "Effects of Chemicals on Ripening of Sugar Cane" by L. G. Nickell and T. T. Tanimoto at pages 152–155 of the 1965 Report of the 24th Annual Conference of Hawaiian Sugar Technologists. Yet there is no commercially successful sugar increase chemical on the market today.

I have discovered that the compounds of Formula I, when applied at the proper time, to sugar cane or sorghum, result in a surprising increase in the sucrose content of the harvested plant.

SUMMARY OF THE INVENTION

In summary, this invention relates to methods of increasing the sugar content of sugar content of sugar cane or sorghum comprising applying thereto from 10 to 60 days prior to normally scheduled harvest an effective (I) 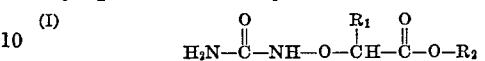

wherein $R_1$ is hydrogen or methyl; and
$R_2$ is hydrogen; ammonium; an alkali metal; an alkaline earth metal; alkyl of 1 to 6 carbon atoms; alkenyl of 3 to 6 carbon atoms; alkynyl of 3 to 6 carbon atoms; cycloalkyl of 3 to 8 carbon atoms; cycloalkenyl of 5 to 8 carbon atoms; substituted alkyl of 1 to 6 carbon atoms wherein the substituents are selected from halogen, alkoxy of 1 to 3 carbon atoms, alkylthio of 1 to 3 carbon atoms, alkoxycarbonyl of 2 to 5 carbon atoms, carboxyl, ammonium carboxyl salts, alkali metal carboxyl salts; and alkaline earth metal carboxyl salts; phenyl; or phenyl substituted with a group selected from alkyl of 1 to 4 carbon atoms, halogen, and nitro.

This invention also relates to compositions useful in the practice of the above-described method of increasing the sugar content of sugar cane or sorghum.

The preferred compounds of Formula I for use in the methods and compositions of this invention are those in which $R_1$ is methyl, and $R_2$ is hydrogen, alkyl of 1 to 3 carbon atoms, allyl or 2-chloroethyl. Illustrative of these preferred compounds are the following:

2-chloroethyl α-ureidooxypropionate;
ethyl α-ureidooxypropionate;
methyl α-ureidooxypropionate; and
allyl α-ureidooxypropionate.

Other compounds illustrative of those useful in the invention are the following:

phenyl α-ureidooxypropionate;
sodium α-ureidooxypropionate;
cyclohexyl α-ureidooxypropionate; and
p-chlorophenyl α-ureidooxypropionate.

DETAILED DESCRIPTION OF THE INVENTION

I have found that when a compound of Formula I is applied to sugar cane or sorghum plants at the proper time during their growth, a surprising increase in the sugar content of the plant is obtained. For these crops, which are grown for sucrose production, this increase in sugar content is observed directly as an increase in the yield from a given area of cropland. While the physiological mechanism involved in this increase in sugar content is not fully understood, it is apparent that the compounds used in this invention redirect the carbohydrate metabolism of the plant in such a way as to increase the sugar level in the plant juices. Thus, in sugar cane varities that are prone to flower, treatment with the compounds of Formula I delays or inhibits flowering when applied at the prescribed time. In addition, the treatment results in an increase in juice purity and a decrease in the extraneous matter that must be handled at the mill when the sugar cane is harvested. Similar benefits are observed in treatment of syrup sorghum with the compounds of Formula I.

Preparation

In the above-mentioned U.S. Pat. 3,282,987 there are described the preparation and properties of certain α-ureidooxycarboxylic acids and their derivatives.

The compounds of Formula I are prepared by reaction of isocyanic acid with an α-aminooxy acid ester

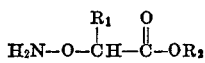

$R_1$ and $R_2$ having the previously stated significance in accordance with the equation

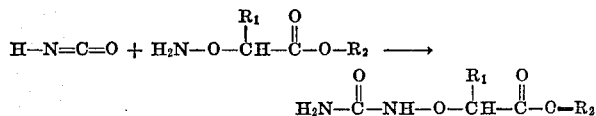

This reaction and a procedure for preparing the α-aminooxy acid esters is described in detail in application Ser. No. 779,914 filed Nov. 29, 1968. The α-ureidooxycarboxylic acid esters thus obtained can be converted to the free acids by acid hydrolysis, for example, with aqueous hydrochloric acid. Metal and ammonium salts can be prepared from the free acids by conventional and obvious metathetical procedures.

An alternate method to prepare the esters of Formula I is represented by the following equation:

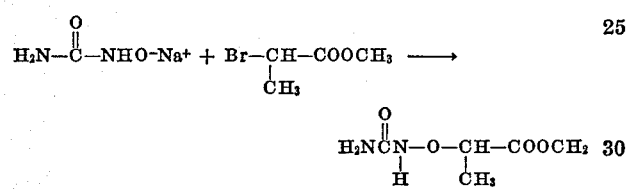

In this reaction it is generally best to run an alcoholic solution of the hydroxyurea, sodium salt gradually into a refluxing alcoholic solution containing the α-bromo ester at a rate slow enough to keep the reaction mixture as close to neutral pH as possible. Undesirable side reaction occur on the alkaline pH side. Sodium alcoholates can be used to form the sodium salt of the hydroxyureas.

Additional details regarding the synthesis of the compounds of the above formula are found in said U.S. Pat. 3,282,987. Although not all of the compounds of Formula I are disclosed in said patent, the methods disclosed therein are applicable.

Compositions

Compositions of the present invention can be prepared by admixing at least one of the ureas with pest control adjuvants or modifiers to provide compositions in the form of solutions, water-soluble and dispersible powders, aqueous dispersions or emulsions, water-extendable solutions and high-strength compositions.

Thus, the compounds can be used with a carrier or diluent agent such as a finely divided solid, a solvent liquid of organic origin, water, a wetting agent, a dispersing agent, an emulsifying agent, an aqueous emulsion or any suitable combination of these.

Compositions of the invention, especially liquids and wettable powders, contain as a conditioning agent one or more surface-active agents in amounts sufficient to render a given composition readily dispersible in water or in oil. By the term "surface-active agent," it is understood that wetting agents, dispersing agents, suspending agents and emulsifying agents are included.

A detailed list of such agents is set forth in "Detergents and Emulsifiers 1968 Annual" by John W. McCutcheon, Inc. In general, less than 10 percent by weight of the surface-active agent is present in the compositions of this invention, although usually the amount of surface-active agent in these compositions is less than 2 percent by weight. However, levels as high as 5 parts of surfactant for each part of active compound gives unusual and unexpected beneficial results. Such compositions have a greater activity than can be expected from a consideration of the activity of the components used separately.

Wettable powders

Wettable powders are water dispersible compositions containing the active material, an inert solid extender, and one or more surfactants to provide rapid wetting and prevent heavy flocculation when suspended in water.

The inert extenders which should be used in the preferred wettable powders of this invention are preferably of mineral origin and the surfactants are preferably anionic or non-ionic. The classes of extenders most suitable for the wettable powder formulations of this invention are the natural clays, diatomaceous earth, and synthetic mineral fillers derived from silica and silicate. Among non-ionic and anionic surfactants, those most suitable for the preparation of the dry, wettable products of this invention are solid forms of compounds known to the art as wetters and dispersants. Occasionally a liquid, non-ionic compound classified primarily as an emulsifier may serve as both wetter and dispersant, but such types are usually avoided because of the difficulty in obtaining homogeneous distribution through the solid mass.

Most preferred fillers for this invention are kaolinites, attapulgite clay and synthetic magnesium silicate. Preferred wetting agents are alkylbenzene sulfonates and alkylnaphthalene sulfonates, sulfated fatty alcohols, amines or acid amides, long-chain acid esters of sodium isethionate, esters of sodium sulfosuccinate, sulfated or sulfonated fatty acid esters, petroleum sulfonates, and sulfonated vegetable oils. Preferred dispersants are methyl cellulose, polyvinyl alcohol, lignin sulfonates, polymeric alkylnaphthalene sulfonates, sodium naphthalene sulfonate, polymethylene bis-naphthalene sulfonate and sodium-N-methyl-N-(long chain acid)taurates.

Wetting and dispersing agents in these preferred wettable powder compositions of this invention are usually present at concentrations of from about 0.5 weight percent to 5 weight percent. The inert extender then completes the formulation. Where needed, 0.1 weight percent to 1.0 weight percent of the extender may be replaced by a corrosion inhibitor or an anti-foaming agent, or both.

Thus, wettable powder formulations of the invention will contain from about 20 to 90 percent active material, from 0.5 to 2.0 weight percent wetting agent, from 0.25 to 5.0 weight percent dispersant, and from 3 to 79.25 weight percent inert extender as these terms are described above.

When the wettable powder contains a corrosion inhibitor or an anti-foaming agent or both, the corrosion inhibitor will not exceed about 1 percent of the composition and the anti-foaming agent will not exceed about 0.5 percent by weight of the composition, both replacing equivalent amounts of the inert extender.

Aqueous suspensions

Aqueous suspensions are prepared by mixing together and sand-grinding an aqueous slurry of a water-insoluble compound of this invention in the presence of dispersing agents, to obtain a concentrated slurry of very finely-divided particles in which the active ingredient is substantially all below 5 microns in size. The resulting concentrated aqueous suspension is characterized by its extremely small particle size, so that when diluted and sprayed coverage is very uniform.

Water-soluble and dispersible powders

Water-soluble powders are prepared from the water soluble salts of this invention. In some instances the dry salt is dissolved in water without any other additive present and the resultant aqueous solution is sprayed on the locus to be treated. In other instances finely divided inert solid extenders and surfactants are blended with the active ingredient. The inert solid extender can be either soluble or insoluble in water. Upon extension with water the active component first disperses and then dissolves, leaving the inert solid in suspension to act as a tracer.

Emulsifiable oils

Emulsifiable oils are usually solutions or dispersions of active material in non-water-miscible solvents together with a surfactant.

For the compounds of this invention, emulsifiable oils can be made by mixing the active ingredient with a solvent and surfactant, or by fine-grinding an oil-insoluble active ingredient in the presence of the oil until the active particles are 5 microns or less in size. Suitable carriers for the compounds of this invention are hydrocarbons (substituted or unsubstituted), and non-water-miscible ethers, esters or ketones. Suitable surfactants are those anionic or non-ionic agents known to the art as emulsifying agents.

Emulsifying agents most suitable for the compositions of this invention are alkylaryl polyethoxy alcohols, alkyl polyether alcohols, polyoxyethylene sorbitol or sorbitan fatty acid esters, polyethylene glycol fatty esters, fatty alkylol amide condensates, amine salts of fatty alcohol sulfates plus long-chain alcohols, and oil soluble petroleum sulfonates. Such emulsifying agents will comprise from about 3 to 10 weight percent of the total composition. As described above, however, up to 5 parts of emulsifying agent for each part of active compound can be used to give synergistic results.

Thus, emulsifiable oil compositions of the present invention will consist of from about 10 to 50 weight percent active material, about 47 to 87 weight percent solvent and about 3 to 10 weight percent emulsifier, as these terms are defined and used above.

Water extendable solutions

The compounds of this invention can also be formulated as solutions in such a way that when diluted with water, both the active and the carrier dissolve in the spray. For this type, the water-soluble compounds are preferred, and suitable solvents include one or more of the following: water, lower alcohols, lower ketones, dimethyl sulfoxide, dimethyl formamide, dimethyl acetamide, glycols, polyglycols, "Cellosolves" and the like. Such compositions usually contain from 5 to 50% active, the rest being solvent. Inclusion of surfactants is often preferred.

High strength compositions

High-strength compositions ordinarily contain 90 to 99 percent active material together with 0.5 to 10 percent surfactant and 0 to 9.5 percent of anti-caking agent.

Application

It will be appreciated that the amount of a compound of Formula I that will be effective to increase the sugar content of sugar cane or sorghum will vary, for example with the particular crop involved, plant density, the type of formulation and application method utilized, prevailing weather conditions and the particular active ingredient utilized. Since many factors are involved, it is not possible to indicate generally any one rate of application which is preferred or even suitable for all situations. However, effective resolution of these factors in determining the effective amount in any given situation is well within the ability of persons of ordinary skill in the art.

Compounds of Formula I are generally applied to the crops at rates of from about 0.2 to 10.0 pounds per acre 10 to 60 days prior to normally scheduled harvest, 20 to 40 days being preferred.

There follow some non-limiting examples which illustrate the compositions of this invention and their use. In these examples, parts and percentages are by weight unless otherwise noted.

EXAMPLE 1

Wettable powder: Percent
  2-chloroethyl α-ureidooxypropionate _____ 30.0
  Partially desulfonated sodium lignin sulfonate _ 1.0
  Alkylnaphthalene sulfonate, sodium salt _____ 1.0
  Attapulgite clay _____ 68.0

These ingredients are blended together, ground in a micropulverizer until substantially all particles are less than 50 microns in diameter and then reblended to homogeneity.

The wettable powder is suspended in water to give 3 pounds of active ingredient in 35 gallons and is applied to 5 month old sugar cane 20 days before harvest. Application is made as a foliar spray at a rate of 3 pounds per acre of active ingredient. The sugar cane is growing in a greenhouse under conditions favoring rapid growth. The harvested plants when compared to untreated plants grown under the same conditions show an increase in sucrose as percent of fresh weight of 120% and an increase in grams of sucrose per stalk of cane of 72%.

EXAMPLES 2–11

The following compounds are substituted individually in a like percent by weight for the 2-chloroethyl α-ureidooxypropionate in Example 1 and are formulated and applied in a like manner with like results being obtained:

Ex.: Compound
  2 _____ Lithium α-ureidooxypropionate.
  3 _____ 2-methoxyethyl α-ureidooxypropionate.
  4 _____ 2-carboxyethyl α-ureidooxypropionate, sodium salt.
  5 _____ 2-carboxyethyl α-ureidooxypropionate, ammonium salt.
  6 _____ Ethyl α-ureidooxypropionate.
  7 _____ Cyclooctyl α-ureidooxypropionate.
  8 _____ 2-carboxyethyl ureidooxyacetate.
  9 _____ 2-propoxyethyl ureidooxyacetate.
  10 _____ Hexyl ureidooxyacetate.
  11 _____ Bromoethyl α-ureidooxypropionate.

EXAMPLE 12

Wettable powder: Percent
  α-Ureidooxypropionic acid _____ 80.0
  Alkylnaphthalene sulfonic acid, Na salt _____ 1.5
  Low viscosity methyl cellulose _____ 0.25
  Attapulgite clay _____ 18.25

The above ingredients are blended together, ground in a hammer mill until substantially all the particles are below 50 microns and then reblended to homogeneity.

This formulation is suspended in water to give three pounds of active ingredient in 40 gallons of water. The suspension is applied at a rate of 3 pounds of active per acre as a foliar spray to sugar cane five months old. The sugar cane is growing in a greenhouse under conditions favoring rapid growth. Twenty days after application the treated plants are harvested and compared with untreated plants. The treated plants show an increase in sucrose as percent of fresh weight of 58% and an increase in grams of sucrose per stalk of cane of 27%.

EXAMPLES 13–16

The following compounds are substituted individually in a like percent by weight for the methyl α-(3-methylureidooxy)propionate in Example 12 and are formulated and applied in a like manner with like results being obtained:

Ex.: Compound
  13 _____ Calcium α-ureidooxypropionate.
  14 _____ Phenyl α-ureidooxypropionate.

EXAMPLE 15

Wettable powder: Percent
  Methyl α-ureidooxypropionate _____ 75.0
  Alkylnaphthalene sulfonic acid, Na salt _____ 1.0
  Sodium naphthalene sulfonic acid _____ 2.0
  Attapulgite clay _____ 22.0

A wettable powder is prepared by blending the dry components and grinding until substantially all the product is below 50 microns.

This composition is dispersed in water at the rate of 4 pounds in 10 gallons. Five gallons of this suspension are sprayed by airplane on ½ acre of sugar cane in a 4 acre field in Northern New South Wales, Australia approximately 60 days before harvest. A second ½ acre strip is treated in the same manner in another part of the field. One-half acre strips adjacent to the treated strips are left untreated. The cane in the field is 3rd ratoon cane (C.V. Pindar). The cane is ratooned eight months prior to treatment and has 6 feet of millable stalk at the time of treatment. At harvest the treated cane yields more sugar per acre than the untreated cane and contains 12.5% sucrose based on fresh weight compared to 9.58% sucrose in the untreated cane.

EXAMPLE 16

Aqueous suspensions:           Percent
  p-Chlorophenyl α-ureidooxypropionate _____ 30.0
  Sodium lignin sulfonate _____ 15.0
  Hydrated attapulgite clay _____ 1.75
  Dioctyl sodium sulfosuccinate _____ 1.0
  Water _____ 52.25

An aqueous suspension is prepared by first mixing and sand-grinding together all of the components except the dioctyl sodium sulfosuccinate and enough water to prepare a concentrated solution of this wetting agent. When the product has been ground until the active ingredient is substantially all below 5 microns, grinding is discontinued and the solution of wetting agent added. The product is characterized by its extremely small particle size and low surface tension so that when diluted and sprayed, the plant foliage is very uniformly coated.

This formulation is dissolved in water and applied as in Example 12 and similar results are obtained.

EXAMPLES 17–22

The following compounds are substituted individually in a like percent by weight for the p-chlorophenyl α-ureidooxypropionate of Example 16 and are formulated and applied in a like manner with like results being obtained:

Ex.:       Compound
 17 _____ 2-hexynyl ureidooxyacetate.
 18 _____ Cyclooct-4-enyl α-ureidooxypropionate.
 19 _____ p-Fluorophenyl α-ureidooxypropionate.
 20 _____ o-Tolyl ureidooxyacetate.
 21 _____ Isopentyl ureidooxyacetate.
 22 _____ Ammonium ureidooxyacetate.

EXAMPLE 23

Wettable powder:                 Percent
  Ethyl ureidooxyacetate _____ 50.0
  Dioctyl sodium sulfosuccinate _____ 1.0
  Partially desulfonated sodium lignin sulfonate _ 0.5
  Kaolin clay _____ 48.5

A wettable powder is prepared by blending the components, and grinding until substantially all particles are below 50 microns.

This formulation is dispersed in water to give 2 pounds of active in 70 gallons of water and is applied as a foliar spray to sugar cane at a rate of 2 pounds of active per acre. The cane is growing in a phytotron under conditions designated to give rapid growth. Three weeks after treatment the treated plants are harvested and compared with untreated plants. The treated plants show an increase in sucrose as percent of fresh weight of 78% and an increase in grams of sucrose per stalk of cane of 18%.

EXAMPLES 24–29

The following compounds are substituted individually in a like percent by weight for the ethyl ureidooxyacetate in Example 23 and are formulated and applied in a like manner with similar results being obtained.

Ex.:       Compound
 24 __ Cyclopent-2-enyl α-ureidooxypropionate.
 25 __ Lithium α-ureidooxypropionate.
 26 __ Hex-2-enyl ureidooxyacetate.
 27 __ Cyclopentyl α-ureidooxypropionate.
 28 __ Propynyl α-ureidooxypropionate.
 29 __ Methoxycarbonylmethyl α-ureidooxypropionate.

EXAMPLE 30

Eight week old syrup type sorghum plants (C.V. Waconia) are treated with a foliar spray of methyl α-ureidooxypropionate at a rate of 0.125, 0.25, and 0.5 pound of active per acre. The seed heads are in the boot at time of treatment. The active ingredient is applied in 104 gallons of water per acre, the water also containing 0.2% of polyoxyethylene sorbitan monolaurate as a wetting agent. Each treatment is replicated three times.

Eight weeks after treatment the plants are harvested, their juice is extracted and the sugar content is determined. The results shown below are reported on the basis of comparison with the untreated plants grown and harvested under the same conditions.

|  | Rate lb./acre | Wt. of stripped plants [1] | Wt. of expressed juice | Percent soluble solids | Mean grams of sucrose [2] |
|---|---|---|---|---|---|
| Untreated plants_____ |  | 100 | 100 | 6.3 | 0.75 |
| Treated plants_____ | 0.125 | 95 | 97 | 16.7 | 11.4 |
| Do_____ | 0.25 | 102 | 101 | 16.7 | 11.4 |
| Do_____ | 0.50 | 94 | 93 | 17.7 | 12.4 |

[1] Stripped plants are stalks with seed heads and leaves removed. At three weeks after treatment 99% of the treated plants have failed to develop seed heads and at time of harvest very few treated plants show any seed head development.
[2] Per 100 ml. of juice.

EXAMPLE 31

Emulsifiable oil:                Percent
  Methyl α-ureidooxypropionate _____ 20.0
  Alkyl aryl polyether alcohol _____ 5.0
  Xylene _____ 75.0

An emulsifiable oil is prepared by mixing the components with agitation until a homogeneous solution results. The oil may be emulsified with water or extended with additional oil for application.

This formulation is emulsified in water and applied to sugar cane in the manner of Example 15 and gives similar results.

EXAMPLE 32

Dispersible powder:              Percent
  Ammonium α-ureidooxypropionate _____ 50.0
  Sodium N-methyl-N-palmitoyl taurate _____ 2.0
  Kaolin clay _____ 48.0

A dispersible powder is prepared by blending the components and milling in a hammer mill. Upon extension with water the active component first disperses and then dissolves, leaving the clay in suspension to act as a tracer for indication of coverage when sprayed.

Three pounds of the formulation is extended with 60 gallons of water and sprayed on sugar cane in the manner of Example 12 and similar results are obtained.

EXAMPLES 33–39

The following compounds are substituted individually in a like percent by weight for the ammonium α-ureidooxypropionate in Example 32 and are formulated and applied in a like manner with similar results being obtained:

Ex.:                              Compound
 33 ____ p-(n-Butyl)phenyl α-ureidooxypropionate.
 34 ____ 2-methylthioethyl α-ureidooxypropionate.
 35 ____ Propylthioethyl α-ureidooxypropionate.
 36 ____ 6-methoxy α-ureidooxypropionate.
 37 ____ p-Bromophenyl α-ureidooxypropionate.
 38 ____ p-Nitrophenyl α-ureidooxypropionate.
 39 ____ Butoxycarbonylmethyl ureidooxyacetate.

EXAMPLE 40

Water extendable solution:

| | Percent |
|---|---|
| Ethyl ureidooxyacetate | 25.0 |
| Dimethylformamide | 75.0 |

The solution is prepared by blending the device material with the solvent. The solution is diluted with water and applied to sugar cane as in Example 12 with similar results.

EXAMPLE 41

Aqueous solution:

| | Percent |
|---|---|
| Potassium α-ureidooxypropionate | 10.0 |
| Water | 90.0 |

An aqueous solution is prepared by warming the components with stirring. The resulting formulation is diluted with water and applied to sugar cane as in Example 12 with similar results.

EXAMPLE 42

Allyl α-ureidooxypropionate is dissolved in water containing 0.05% acetyl phenoxypolyethoxyethanol to give a concentration of 0.45% active. This solution is applied to five month old sugar cane plants growing in a phytotron. Application is made as a foliar spray at a rate equavalent to 3 pounds of active ingredient per acre. Twenty days after treatment the plants are harvested and compared with untreated plants. The treated plants show an increase in sucrose as percent of fresh weight of 109% and an increase in grains of sucrose per stalk of cane of 67%.

EXAMPLE 43

Dispersible powder:

| | Percent |
|---|---|
| Sodium α-ureidooxypropionate | 15.0 |
| Sodium lauryl sulfate | 60.0 |
| Synthetic fine silica | 25.0 |

The above composition is prepared by blending, grinding and reblending the components. When added to water, both the active material and the surfactant dissolve, leaving only silica in suspension. The high surfactant level is found to increase the activity of the composition so that much lower application rates are effective.

This formulation is diluted with water and applied to sugar cane as in Example 12 with similar results.

EXAMPLE 44

| | Percent |
|---|---|
| Ethyl α-ureidooxypropionate | 95.0 |
| Alkyl aryl polyethylene glycol ether | 1.0 |
| Synthetic silica | 4.0 |

The above components are blended and micropulverized to pass a 60-mesh screen. This formulation is useful in the preparation of other types of formulation, but can also be used directly such as by diluting it with water and applying it to sugar cane in the manner of Example 12.

I claim:

1. A method for increasing the sugar content of sugar cane and sorghum comprising applying thereto from 10 to 60 days prior to normally scheduled harvest an effective amount of a compound of the formula

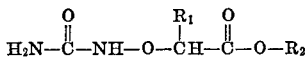

wherein $R_1$ is methyl and $R_2$ is methyl or ethyl.

2. The method of claim 1 wherein said compound is ethyl α-ureidooxypropionate.

3. The method of claim 1 wherein said compound is methyl α-ureidooxypropionate.

4. A composition comprising a carrier material and, in amounts sufficient to increase the sugar content of sugar cane and sorghum, a compound of the formula

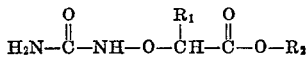

wherein $R_1$ is methyl and $R_2$ is methyl or ethyl.

5. The composition of claim 4 wherein said compound is ethyl α-ureidooxypropionate.

6. The composition of claim 4 wherein said compound is methyl α-ureidooxypropionate.

References Cited

UNITED STATES PATENTS 3,457,063   7/1969   Neighbors   71—106 X

JAMES O. THOMAS, Jr., Primary Examiner